(12) United States Patent
Paritsky

(10) Patent No.: US 6,498,853 B2
(45) Date of Patent: Dec. 24, 2002

(54) ECHO-CANCELLING OPTICAL MICROPHONE

(75) Inventor: Alexander Paritsky, Modiin (IL)

(73) Assignee: Phone-Or Ltd., Or-Yehuda (IL)

( * ) Notice: Subject to any disclaimer, the term of this patent is extended or adjusted under 35 U.S.C. 154(b) by 11 days.

(21) Appl. No.: 09/764,531

(22) Filed: Jan. 16, 2001

(65) Prior Publication Data

US 2001/0043378 A1 Nov. 22, 2001

(30) Foreign Application Priority Data

Jan. 18, 2000 (IL) .................................................. 134096

(51) Int. Cl.$^7$ ................................................ H04B 3/20
(52) U.S. Cl. ......................................... 381/66; 381/172
(58) Field of Search ........................ 381/66, 172, 170; 359/149, 130, 152, 154

(56) References Cited

U.S. PATENT DOCUMENTS 5,333,205 A * 7/1994 Bogut et al. ................. 381/172

FOREIGN PATENT DOCUMENTS

FR 2247032 5/1975
JP 09326730 12/1997

* cited by examiner

*Primary Examiner*—Minsun Oh Harvey
(74) *Attorney, Agent, or Firm*—Townsend and Townsend and Crew LLP

(57) ABSTRACT

The invention provides an echo-cancelling system for an optical microphone, for eliminating acoustical echoes from a source of acoustical signals to which the microphone is connected, the system including a source of light for illuminating the acoustical membrane; a photodetector for receiving light reflected from the membrane and for producing output signals; means for supplying power to the source of light; a preamplifier for amplifying the output signals; an input terminal for receiving electrical signals from the source of acoustical signals; a time delay circuit for receiving signals from the source of acoustical signals, and a circuit for regulating the amplitude of the delayed electrical signals, connected between the delay circuit and the source of light, for changing the current supplied to the source of light by the light source power means.

5 Claims, 1 Drawing Sheet

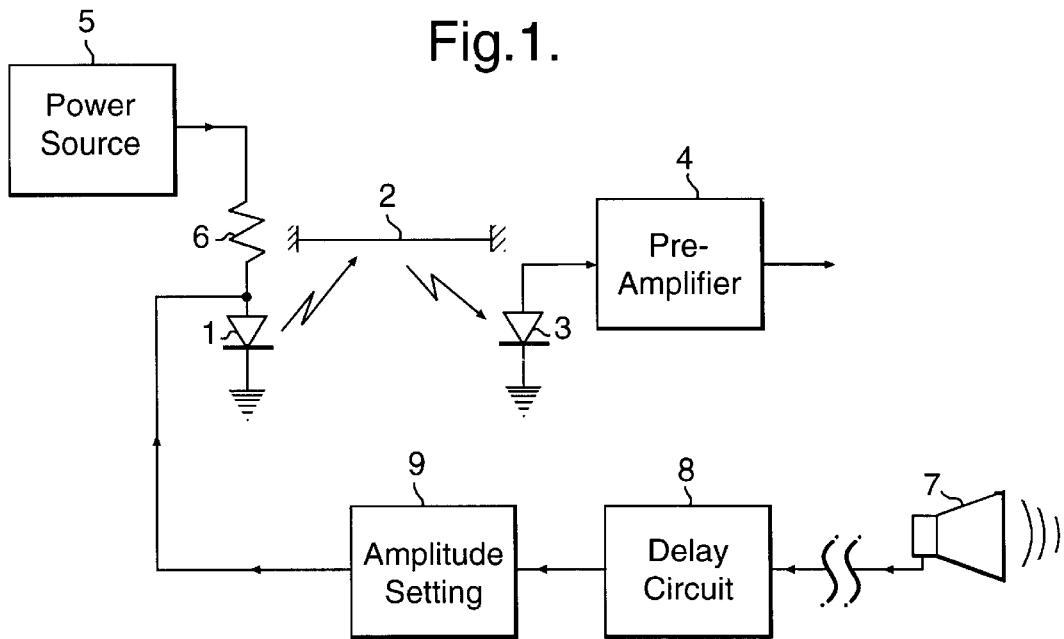
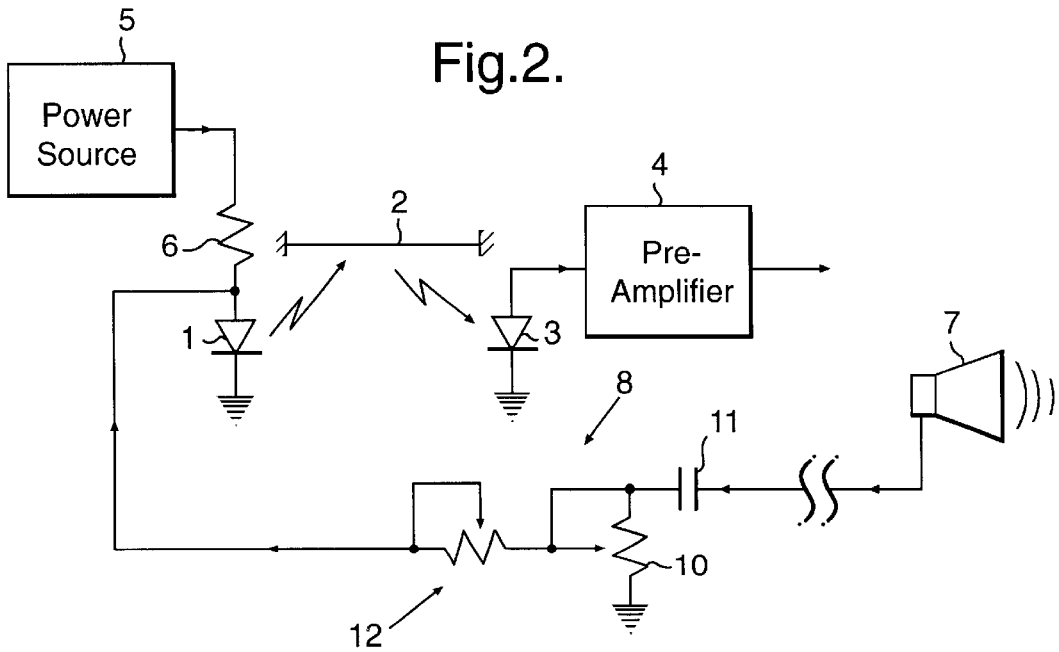

ECHO-CANCELLING OPTICAL MICROPHONE

FIELD OF THE INVENTION

The present invention relates to optical microphones, and more particularly to an echo-cancelling system for optical microphones.

BACKGROUND OF THE INVENTION

U.S. Pat. No. 5,771,091 discloses an optical microphone/sensor including a source of light for producing light used in sensing measurements, which light is transmitted to a reflective membrane either directly from the source or through an optical guide, e.g., an optical fiber or a solid body. Light reflected from the membrane is propagated to a photodetector, either directly or through another light guide. Output signals from the photodetector are proportional to the intensity of the reflected light.

As is experienced by many, echoes emanating from a nearby loudspeaker or other source present disturbances and impair quality communication.

DISCLOSURE OF THE INVENTION

It is therefore a broad object of the present invention to provide an optical microphone system which substantially eliminates echo signals in communication systems to which it is connected, thereby improving the quality of communications.

The invention thus provides an echo-cancelling system for an optical microphone, for eliminating acoustical echoes from a source of acoustical signals to which the microphone is connected, the system comprising a source of light for illuminating the acoustical membrane; a photodetector for receiving light reflected from said membrane and for producing output signals; means for supplying power to said source of light; a preamplifier for amplifying said output signals; an input terminal for receiving electrical signals from said source of acoustical signals; a time delay circuit for receiving signals from said source of acoustical signals, and a circuit system for regulating the amplitude of the delayed electrical signals, connected between said delay circuit and said source of light, for changing the current supplied to said source of light by said light source power means.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is an electrical-optical scheme of an echo-cancelling optical microphone in accordance with the present invention, and FIG. 2 is an electrical-optical scheme of an echo-cancelling optical microphone having an R-C based time delay circuit and a variable resistor.

DETAILED DESCRIPTION

There is shown in FIG. 1 an echo-cancelling optical microphone according to the present invention, comprising a light-emitting diode (LED) 1 that illuminates a microphone membrane 2. The light reflected from the membrane 2 is transmitted, either directly or through a light guide, to a photodetector (PD) 3, the electrical output of which is connected to a preamplifier 4. The electrical input of LED1 is connected to power source 5, through resistor 6. The setting of the power source 5 determines the current through LED 1. The intensity of light produced by LED 1 is directly proportional to the power supplied by power source 5: the higher the current, the higher is the light intensity produced, and the higher is the light intensity reflected by membrane 2 to PD 3. consequently, the output signal fed from PD3 to the preamplifier 4 is higher. The sensitivity of the optical microphone is thus proportional to the intensity of the light produced by LED 1; namely, it is proportional to the electric current fed to LED 1.

The source of an echo, which may affect the sensitivity of the microphone, is a loudspeaker 7. The loudspeaker 7 generates acoustical vibrations that impinge upon membrane 2 and modulate the intensity of light produced by LED 1. This modulation is sensed by PD 3, undesirable echo interference is produced and introduced into the communication system to which the microphone is connected through preamplifier 4. The undesirable echo interference may be eliminated by means of negative feedback signals emanating from the loudspeaker 7. The signals are sent through a time delay circuit 8 and an amplitude setting circuit 9 to the LED 1. The time delay circuit 8 produces a change of the loudspeaker's signal phase in such a way that the signals arrive at LED 1 which modulates the light signal produced by the LED in the opposite phase compared with the acoustical echo signal that impinges on membrane 2.

The amplitude setting system for changing the amplitude of electrical signals from the time delay circuit 8 to the LED 1, changes the amplitude of the signals so that the amplitude of modulation of the light intensity produced by LED 1 will be equal to the amplitude of the modulation of membrane 2. In this way, modulation of membrane 2 produced by the acoustical echo signal of loudspeaker 7 will be fully compensated and cancelled by the modulation phase opposite to the phase of the light signal of LED 1.

FIG. 2 shows one possible detailed embodiment of the scheme shown in FIG. 1, when the time delay circuit 8 comprises an R-C circuit composed of resistor 10 and capacitor 11 and wherein the amplitude setting circuit 9 is formed by a variable resistor 12.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An echo-cancelling system for an optical microphone, for eliminating acoustical echoes from a source of acoustical signals to which the microphone is connected, the system comprising:

a source of light for illuminating the acoustical membrane;

a photodetector for receiving light reflected from said membrane and for producing output signals;

means for supplying power to said source of light;

a preamplifier for amplifying said output signals;

an input terminal for receiving electrical signals from said source of acoustical signals;

a time delay circuit for receiving signals from said source of acoustical signals, and a circuit for regulating the amplitude of the delayed electrical signals, connected between said delay circuit and said source of light, for changing the current supplied to said source of light by said light source power means.

2. The system as claimed in claim 1, wherein said time delay circuit is an R-C circuit.

3. The system as claimed in claim 2, wherein the resistor of said R-C circuit is a potentiometer.

4. The system as claimed in claim 1, wherein said circuit for regulating the amplitude of the delayed electrical signals is a variable resistor.

5. The system as claimed in claim 1, wherein said source of acoustical echo is a loudspeaker.

* * * * *